US006253866B1

(12) United States Patent
Kojima (10) Patent No.: US 6,253,866 B1
(45) Date of Patent: Jul. 3, 2001

(54) INTERNAL COMBUSTION ENGINE CONTROL APPARATUS OF HYBRID POWERED VEHICLE

(75) Inventor: Masakiyo Kojima, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/200,455

(22) Filed: Dec. 3, 1998

(30) Foreign Application Priority Data

Dec. 9, 1997 (JP) .................................................. 9-338898

(51) Int. Cl.[7] ...................................................... B60K 1/00
(52) U.S. Cl. ........................ 180/65.2; 180/165; 180/65.3; 477/2
(58) Field of Search .................................. 180/165, 65.1, 180/65.2, 65.3, 65.4, 65.8; 477/2, 3; 701/22, 103, 104, 105; 318/139, 268

(56) References Cited

U.S. PATENT DOCUMENTS

| | | |
|---|---|---|
| 5,588,498 | 12/1996 | Kitada . |
| 5,697,466 | 12/1997 | Moroto et al. . |
| 5,778,326 * | 7/1998 | Moroto et al. ........................ 701/22 |
| 5,862,497 * | 1/1999 | Yano et al. ............................ 701/22 |
| 5,898,282 * | 4/1999 | Drozlz et al. ........................ 180/5.4 |
| 5,934,395 * | 8/1999 | Koiche et al. ....................... 180/5.2 |
| 5,934,396 * | 8/1999 | Kurita .................................. 180/5.2 |
| 5,934,397 * | 8/1999 | Schaper ................................ 180/5.2 |
| 5,959,420 * | 9/1999 | Boberg et al. ....................... 318/139 |

FOREIGN PATENT DOCUMENTS

| | | |
|---|---|---|
| 0 570 241 A1 | 11/1993 | (EP) . |
| 0 800 945 A2 | 10/1997 | (EP) . |
| 5-270294 | 10/1993 | (JP) . |
| 5-328528 | 12/1993 | (JP) . |
| 6-165308 | 6/1994 | (JP) . |
| 9-233601 | 9/1997 | (JP) . |

* cited by examiner

Primary Examiner—Richard M. Camby
(74) Attorney, Agent, or Firm—Oliff & Berridge, PLC

(57) ABSTRACT

A hybrid powered vehicle including an internal combustion engine and an electric motor is constructed to activate earlier an exhaust gas purifying catalyst without any decline of drivability. The hybrid powered vehicle has an electric power generating unit driven by the internal combustion engine, an electric power accumulating element for accumulating the electric power generated by the electric power generating unit, an electric motor, for driving wheels, of which a driving source is the electric power generated by the electric power generating unit or the electric power accumulated in the electric power accumulating element, a power distributing mechanism for distributing the driving force outputted from the internal combustion engine to the electric power generating unit and the wheels, a warm-up operation control unit for controlling a warm-up operation of the internal combustion engine when the internal combustion engine is started up under a predetermined condition, and an operation state switching unit for switching, when a high-output operation request of the internal combustion engine occurs during the warm-up operation of the internal combustion engine by the warm-up operation control unit, the internal combustion engine from the warm-up operation state to a high-output operation state.

18 Claims, 3 Drawing Sheets

INTERNAL COMBUSTION ENGINE CONTROL APPARATUS OF HYBRID POWERED VEHICLE

BACKGROUND OF THE INVENTION

The present invention relates to a technology of controlling an internal combustion engine of a hybrid powered vehicle including two driving sources, i.e., an internal combustion engine and an electric motor.

In recent years, what has been requested of an automobile etc is to reduce a burned fuel quantity of an internal combustion engine and to purify an exhaust gas discharged from the internal combustion engine. In response to these requests, there has been developed a hybrid powered vehicle including two driving sources, i.e., the internal combustion engine and an electric motor.

The known hybrid powered vehicle described above includes the internal combustion engine, a generator driven by a driving force of the internal combustion engine, a battery for storing the electric power generated by the electric motor, the electric motor driven by the electric power of the generator or the battery, and a power distributing mechanism for selectively distributing the driving force of the internal combustion engine to the generator and wheels, wherein a start and a stop of the internal combustion engine are controlled corresponding to the driving force required and an electric power accumulation quantity of the battery.

In this type of hybrid powered vehicle, a transmission of the driving force of the internal combustion engine to the generator and the wheels is cut off, or alternatively the internal combustion engine is stopped. Then, the battery electric power is applied to the electric motor, and the wheels are driven by the driving force of the electric motor.

Subsequently, the hybrid powered vehicle is, when in a normal traveling operation, constructed so that the internal combustion engine is actuated, the driving force of the internal combustion engine is distributed to both of the generator and the wheels, then the electric motor is driven by the electric power generated by the generator, and the driving force of the electric motor is transmitted to the wheels. In this case, it follows that the hybrid powered vehicle travels with the driving forces of the internal combustion engine and of the electric motor.

Furthermore, the hybrid powered vehicle is, when in a high-load operation such as an acceleration etc, constructed so that the internal combustion is actuated, the driving force of the internal combustion engine is distributed to the electric motor and the wheels, the electric motor is driven by electric power obtained by adding the electric power generated by the generator to the battery electric power, and the driving force of the electric motor is transmitted to the wheels. In this case, the hybrid powered vehicle travels with the driving forces of the internal combustion engine and of the electric motor as in the case of the normal traveling operation, however, since the battery electric power in addition to the electric power of the generator is applied to the electric motor, the driving force of the electric motor becomes larger than in the normal traveling operation.

Moreover, the hybrid powered vehicle is, when in decelerating and braking operations of the vehicle, constructed so that a transmission of the driving force of the internal combustion engine to the generator and the wheels is cut off, or alternatively the internal combustion engine is stopped, then the electric power regenerated by applying rotary forces of the wheels to the electric motor, and the thus obtained electric power is accumulated in the battery.

Incidentally, the hybrid powered vehicle is, if an electric power accumulated quantity of the battery is under a predetermined value, constructed so that the internal combustion engine is started up, the driving force of the internal combustion engine is distributed to the generator and to the wheels, and the electric power generated by the generator is distributed to the battery and the electric motor, thereby charging the battery with the electric power.

According to the thus constructed hybrid powered vehicle, it is feasible to efficiently operate the internal combustion engine, remarkably reduce a burned fuel rate, decrease a quantity of the exhaust gas and purify the exhaust gas.

By the way, in the hybrid powered vehicle described above, the start and stop of the internal combustion engine are repeated depending on a traveling condition, and hence temperatures of exhaust gas purifying elements such as the exhaust gas purifying catalyst and an air/fuel ratio sensor etc tend to be lower than an activation temperature. If the internal combustion engine is actuated in a state where the temperatures of the exhaust gas purifying elements are lower than the activation temperature, the exhaust gas purifying catalyst is incapable of sufficiently purifying Nox, CO and HC etc in the exhaust gas, resulting in deterioration of the exhaust emission.

What is known as an apparatus for obviating this problem is a control apparatus of an engine driving generator of the hybrid powered vehicle, which is disclosed in Japanese Patent Application Laid-Open Publication No.5-328528. This control apparatus is intended to restrain the deterioration of the exhaust emission, which involves rising an exhaust temperature and an exhaust quantity up to a predetermined quantity by controlling, when the exhaust gas purifying elements such as the exhaust gas purifying catalyst and the air/fuel ratio sensor etc are at low temperatures, an engine output and the number of engine rotations in order to decrease an energy efficiency of the internal combustion engine, and completing a warming-up operation of the exhaust gas purifying elements at an early stage.

The above-described control apparatus of the engine driving generator of the hybrid powered vehicle, even if there is requested a large driving force as needed for the acceleration etc when the warm-up operation of the internal combustion engine is required, preferentially executes the warm-up operation and is therefore incapable of outputting the driving force requested, resulting in such a problem that the drivability declines.

SUMMARY OF THE INVENTION

It is a primary object of the present invention, which was contrived to overcome the problems described above, to provide a technology capable of activating an exhaust gas purifying catalyst etc at an early stage without any decline of a drivability in a hybrid powered vehicle including an internal combustion engine and an electric motor.

To accomplish this object, the present invention adopts the constructions which follow.

According to a first aspect of the present invention, there is provided an internal combustion engine control apparatus of a hybrid powered vehicle including an internal combustion engine, an electric motor, and a warm-up operation control unit for making a driving force of the electric motor as a main driving source for traveling under a predetermined condition, and controlling a warm-up operation of the internal combustion engine, the internal combustion engine control apparatus comprising an operation state switching element for switching, when there is requested a driving force larger than a driving force that can be outputted by the electric motor and by the internal combustion engine which is on a warm-up operation during the warm-up operation of the internal combustion engine, the internal combustion engine from a warm-up operation state to a high-output operation state.

Based on this construction, if a large driving force as needed for an acceleration etc is required during a warm-up operation of the internal combustion engine, the operation state of the internal combustion engine is switched over from the warm-up operation state to the high-output operation state, and the driving force outputted from the internal combustion engine is augmented. In this case, the driving force of the whole hybrid powered mechanism increases, and therefore the hybrid powered vehicle is capable of quickly performing the acceleration in response to the request.

On the other hand, when the internal combustion engine comes to the high-output operation state, an exothermic quantity of the internal combustion engine increases, and the temperature of the exhaust gas discharged out of the internal combustion engine also rises. Hence, it is possible to activate earlier the exhaust gas purifying elements.

Herein, according to the present invention, even when there occurs a request for increasing the driving force for traveling the vehicle during the warm-up operation, the warm-up operation is preferentially carried out, and therefore the driving force must be increased within a range in which the internal combustion engine being on the warm-up operation is capable of outputting it. It is required that the warm-up operation be conducted after ensuring the driving force to some extent. According to the present invention, however, when there arises the request for increasing the driving force for traveling the vehicle during even the warm-up operation, it is feasible to tame a measure for increasing the driving force by effecting a switch-over from a warm-up operation state to a high-output operation state, and hence there is nor necessity for considering the driving force of the internal combustion engine. Therefore, more positive warm-up operation control can be done.

Hence, according to the present invention, if the large driving force as needed for the acceleration etc is required during even the warm-up operation of the internal combustion engine, the operation state of the internal combustion can be switched over from the warm-up operation state to the high-output operation state, whereby the driving force requested by the driver can be outputted and the drivability enhances.

On the other hand, according to the present invention, since the warm-up operation can be performed without taking the driving force of the internal combustion engine into consideration, the more positive warm-up operation can be performed, and it is feasible to activate earlier the internal combustion engine and the exhaust gas purifying catalyst.

Note that the warm-up-operation control connoted herein is not the control for giving the priority to the internal combustion generating well the driving force but the control for giving the priority to the early activation of the exhaust gas purifying elements such as the exhaust gas purifying catalyst and the air/fuel ratio sensor etc.

According to a second aspect of the present invention, a hybrid powered vehicle to which an internal combustion engine control apparatus of the present invention is applied, is constructed such that a driving force outputted from an internal combustion engine is used as a driving source for making the vehicle traveled or a driving source for generating electric power, the electric power generated by the driving force of the internal combustion engine is supplied to an electric motor or to electric power accumulating means for supplying the electric motor with the electric power, and the hybrid powered vehicle travels with the driving force outputted from at least one of the internal combustion engine and the electric motor and travels with its main driving source being the driving force from the electric motor driven by the electric power of the electric power accumulating means while controlling a warm-up operation of the internal combustion engine under a predetermined condition.

According to a third aspect of the present invention, a hybrid powered vehicle to which an internal combustion engine control apparatus of the present invention si applied, comprises an internal combustion engine, an electric power generating unit driven by the internal combustion engine, an electric power accumulating element for accumulating the electric power generated by the electric power generating unit, an electric motor supplied for driving wheels with the electric power generated by the electric power generating unit or the electric power accumulated in the electric power accumulating element, a power distributing mechanism for distributing the driving force outputted from the internal combustion engine to the electric power generating unit and wheels, and a warm-up operation control unit for controlling a warm-up operation of the internal combustion engine when the internal combustion engine is started up under a predetermined condition.

In short, what is sufficient as the hybrid powered vehicle to which the internal combustion engine control apparatus according to the present invention can be applied, may be a hybrid powered vehicle capable of traveling with the driving force given from a driving source excluding the internal combustion engine in order to permit the warm-up operation of the internal combustion engine.

Further, the warm-up operation control according to the present invention may also be a process of controlling a fuel injection quantity so that an air/fuel ratio of a fuel-air mixture burned in at least a part of cylinders of said internal combustion engine becomes a fuel excessive atmosphere (rich atmosphere), and that an air/fuel ratio of the fuel-air mixture burned in some other cylinders becomes an oxygen excessive atmosphere (lean atmosphere). Further, in the case of the internal combustion engine including a variable valve timing mechanism capable of changing a timing of opening and closing an exhaust valve, a timing of opening the exhaust valve is advanced, and the exhaust gas purifying elements may be warmed up.

Moreover, the operation state switching element may gradually switch over an operation state of the internal combustion engine. On this occasion, the operation state switching element may gradually switch the operation state at a predetermined switching velocity. Under such operation state switching control, it is possible to restrain an abrupt fluctuation of the driving force outputted from the internal combustion engine, and the drivability can be more enhanced.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

An embodiment of an internal combustion engine control apparatus of a hybrid powered vehicle according to the present invention, will hereinafter be described with reference to the accompanying drawings.

Figure 1:
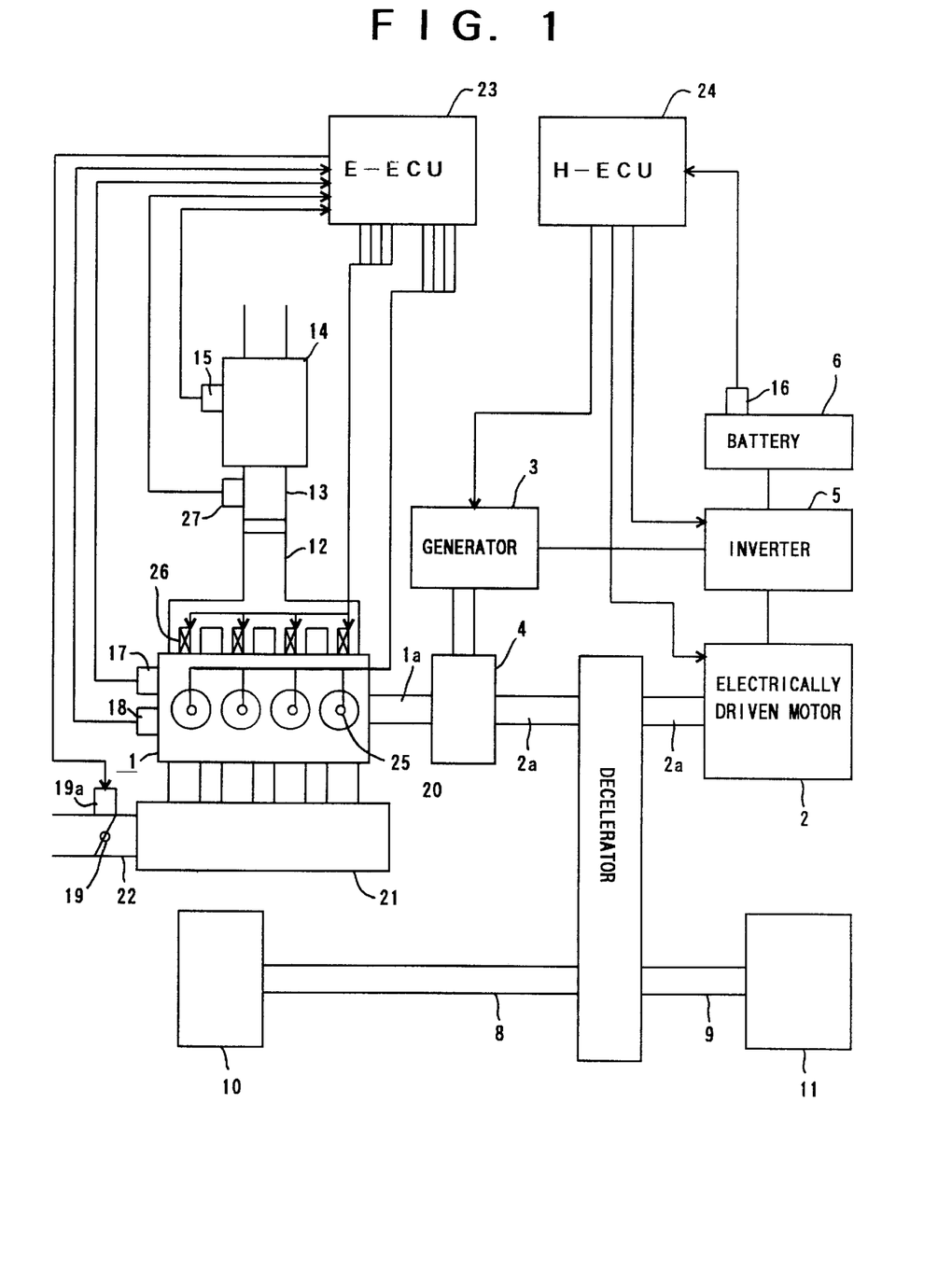
FIG. 1 is a schematic diagram showing a construction of a hybrid mechanism of a hybrid powered vehicle to which an internal combustion engine control apparatus of the present invention is applied.

FIG. 1 is a schematic diagram showing a construction of a hybrid mechanism of a hybrid powered vehicle to which the internal combustion engine control apparatus according to the present invention is applied.

The hybrid mechanism includes an internal combustion engine 1, and a power distributing mechanism 4, connected to an engine output shaft (crank shaft) 1a of the internal combustion engine 1, for distributing a rotary force to a generator 3 and a rotary shaft 2a of an electrically-driven motor. The hybrid mechanism also includes an inverter 5 for selectively applying the electric power generated by the generator 3 to the electrically-driven motor 2 and a battery 6, or the electric power accumulated in the battery 6 to the electrically-driven motor 2. The hybrid mechanism further includes a decelerator 7 for decelerating the rotary force of the rotary shaft 2a of the electrically-driven motor 2 and transmitting the decelerated rotary force to drive shafts 8, 9, and wheels 10, 11 secured to the drive shafts 8, 9.

Then, each of cylinders of the internal combustion engine 1 is fitted with a spark plug 25 for burning a mix gas, and an exhaust branch pipe 12 and a suction branch pipe 20 are connected to each cylinder.

The exhaust branch pipe 12 is connected to an exhaust pipe 13 which is connected to an unillustrated silencer. Then, an exhaust gas purifying catalyst 14 is provided halfway of the exhaust pipe 13. A portion, located upstream of the exhaust gas purifying catalyst 14, of the exhaust pipe 13 is attached with an air/fuel ratio sensor 27 for outputting en electric signal corresponding to an air/fuel ratio of the exhaust gas flowing inside the exhaust pipe 13.

The exhaust gas purifying catalyst 14 is, for instance, activated at a predetermined temperature (e.g., 300° C.) or higher, and makes HC and CO in the exhaust gas react to $O_2$ in the exhaust gas, which are thus oxidated into $H_2O$ and $CO_2$. At the same time, the exhaust gas purifying catalyst makes NOx in the exhaust gas react to HC and CO in the exhaust gas, which are thus reduced to $H_2O$, $CO_2$ and $N_2$.

The suction branch pipe 20 is connected to a surge tank 21 to which the suction pipe 22 is connected. Each suction branch pipe 20 is fitted with a fuel injection valve 26 of which injection hole faces to a suction port of each cylinder. Provided midways of the suction pipe 22 is an actuator 19a constructed of a throttle valve 19 for controlling a flow rate of the air flowing inside the suction pipe 22 and of a motor for opening and closing the throttle valve 19.

Subsequently, the power distributing mechanism 4 actualizes a power distributing device according to the present invention. This power distributing mechanism 4 is constructed of, e.g., a planetary gear, and a rotary shaft of a planetary carrier of the planetary gear is linked to the engine output shaft 1a. Then, a rotary shaft of a ring gear disposed outside the planetary carrier is connected to the rotary shaft 2a, and subsequently a rotary shaft of a sun gear disposed inwardly of the planetary carrier is connected to the generator 3. Then, a rotary force of the planetary carrier is transmitted to the ring gear and the sub gear via a pinion gear rotatably supported on the planetary carrier.

The generator 3 is constructed of an AC synchronous electric motor and actualizes an electricity generating device according to the present invention. The battery 6 is composed of a nickel hydrogen battery cell etc and actualizes an electric power accumulating device according to the present invention.

The electrically driven motor 2 is constructed of an AC synchronous electric motor etc and actualizes an electric motor according to the present invention. Then, the electrically driven motor 2 rotationally drives the rotary shaft 2a by the electric power generated by the generator 3 or the electric power outputted from the battery 6. Further, the electrically driven motor 2 regenerates the electric power by utilizing such a point hat the rotary forces of the wheels 10, 11 are transmitted to the rotary shaft 2a via the drive shafts 8, 9 and the decelerator 7 when decelerating the vehicle. The thus regenerated electric power is accumulated in the battery via the inverter 5.

The inverter 5 is classified as an electric power converter constructed of a combination of a plurality of power transistors, and selectively switches, by controlling the power transistors, an application of the electric power generated by the generator 3 to the battery 6, an application of the electric power generated by the generator to the electrically driven motor 2, an application of the electric power stored in the battery 6 to the electrically driven motor 2, and an application of the electric power regenerated by the electrically driven motor 2.

Herein, what is generated by the generator 3 is AC electric power, and what is accumulated in the battery 6 is DC electric power. Then, both of the driving electric power and the regenerated electric power of the electrically driven motor 2 are AC electric power. Therefore, the inverter 5 converts the AC current generated by the generator 3 into the DC current and thereafter applies the DC current to the battery 6, then converts the DC current accumulated in the battery 6 into the AC current and thereafter applies the AC current to the electrically driven motor 2, subsequently converts the AC current generated by the generator 3 into the DC current and thereafter applies the DC current to the battery 6, and finally converts the AC current regenerated by the electrically driven motor 2 into the DC current and thereafter applies the DC current to the battery 6.

Attached also to the internal combustion engine 1 are a variety of sensors such as a water temperature sensor 17 for outputting an electric signal corresponding to a temperature of cooling water, and a crank position sensor 18 for detecting the number of rotations of the engine output shaft 1a. The exhaust gas purifying catalyst 14 is fitted with a catalyst temperature sensor 15 for outputting an electric signal corresponding to a bed temperature of the catalyst. Then, the battery 16 is attached with an SOC meter 16 for outputting an electric signal corresponding to a charging quantity of the battery 16.

Then, the catalyst temperature sensor 15, the water temperature sensor 17, the crank position sensor 18, the air/fuel ratio sensor 27 are connected via electric wires to an electronic control unit (E-ECU) 23 for controlling the internal combustion engine, and output signals of the respective sensors are inputted to the E-ECU 23. Further, the spark plug 25, the fuel injection valve 26 and the actuator 19a are also connected via the electric wires to the E-ECU 23.

On the other hand, the electrically driven motor 2, the generator 3, the inverter 5 and the SOC meter 16 are connected via the electric wires to an electronic control unit (H-ECU) 24 for integrally controlling the hybrid mechanism.

The E-ECU 23 judges an operation state of the internal combustion engine 1, wherein the output signals from the variety of sensors serve as parameters. The E-ECU 23 calculates, corresponding to the operation state thereof, an ignition timing, a fuel injection time (fuel injection quantity), a fuel injection timing, and a suction air quantity. Then, the E-ECU 23 controls the spark plug 25 on the basis of the calculated ignition timing, then controls the fuel injection valve 26 on the basis of the fuel injection time and the fuel injection timing, and further controls the actuator 19a on the basis of the suction air quantity.

When controlling the fuel injection valve 26, the E-ECU 23 refers to an output signal value of the air/fuel ratio sensor 27, and performs feedback control so that an air/fuel ratio of the exhaust gas flowing to the exhaust gas purifying catalyst 14 becomes a desired air/fuel ratio.

On the other hand, the E-ECU 24 controls the generator 3 and the inverter 5 on the basis of a treading quantity (accelerator aperture) of an unillustrated accelerator pedal and an output signal of the SOC meter 16, and controls the internal combustion engine 1 through he E-ECU 23.

To be more specific, the H-ECU 24 does not start up the internal combustion engine 1 during a low-load period when the vehicle is stopped and when the accelerator aperture is small, and controls the inverter 5 in order to apply the electric power of the battery 6 to the electrically driven motor 2. At this time, the electrically driven motor 2 rotates the rotary shaft 2a with the electric power given from the battery 6, and the rotary force of the rotary shaft 2a is transmitted to the wheels 10, 11 via the decelerator 7 and the drive shafts 8, 9. Consequently, there travels the vehicle of which the drive source is only the electric power of the battery 6.

On this occasion, the H-ECU 24 always monitors the output signal value of the SOC meter 16 and, if the output signal value decreases under a predetermined value, starts up the internal combustion engine 1 through the E-ECU 23 and makes the power distributing mechanism 4 distribute the driving force outputted from the internal combustion engine 1 to the generator 3 and the rotary shaft 2a and subsequently distribute the electric power generated by the generator 3 to the battery 6 and to the electrically driven motor 2 by controlling the generator 3 and the inverter 5.

In this case, the rotary shaft 2a of the electrically driven motor 2 is rotated by a driving force obtained by adding the driving force distributed by the power distributing mechanism 4 and the driving force of the electrically driven motor 2, and hence it follows that the vehicle travels by a part of the driving force outputted from the internal combustion engine 1 and a part of the electric power generated by the remaining of the above engine driving force.

Thereafter, when the output signal of the SOC meter 16 reaches a predetermined changing level, the H-ECU 24 controls the E-ECU 23 to halt the internal combustion engine 1 and also controls the inverter to drive the electrically driven motor 2 with the electric power of the battery 6.

Next, normally when the vehicle is in a traveling state, the H-ECU 24 makes the vehicle traveled by only the driving force (including the driving force distributed to the rotary shaft 2a by the power distributing mechanism 4, and the electric power generated by the driving force distributed to the generator 3 by the power distributing mechanism 4) of the internal combustion engine 1 without using the electric power of the battery 6.

On this occasion, the H-ECU 24 calculates a driving force requested by a driver (which is hereinafter referred to as a request driving force) on the basis of the accelerator aperture. Then, the H-ECU 24 transmits the calculated request driving force to the E-ECU 23. The request driving force transmitted from the H-ECU 24 to the E-ECU 23 is defined as a value, wherein the suction air quantity of the internal combustion engine 1 and the number of engine rotations serve as parameters. The H-ECU 24 has a map showing a relationship between the suction air quantity, the number of engine rotations and the driving force of the internal combustion engine, then specifies from this map the suction air quantity and the number of engine rotations which correspond to a desired driving force of the internal combustion engine, and transmits the thus specified suction air quantity and number of engine rotations as a request driving force to the E-ECU 23.

At this time, the E-ECU 23 controls the actuator 19, and the spark plug 25 or the fuel injection valve 26 in accordance with the suction air quantity and the number of engine rotations designated by the H-ECU 24, thus making ab actual driving force of the internal combustion engine coincident with the request driving force.

Further, if the accelerator aperture abruptly increases as in the case of the acceleration of the vehicle, the H-ECU 24 calculates the request driving force from the accelerator aperture, and also calculates a total driving force that can be generated in the whole hybrid mechanism from the operation state of the internal combustion engine 1, the number of rotations of the electrically driven motor 2 and the accumulated electricity quantity (the output signal value of the SOC meter 16) of the battery 6.

Subsequently, the H-ECU 24 compares the request driving force with the total driving force and, if the request driving force is equal to or smaller than the total driving force, calculates a quantity of the electric power that should be applied to the electrically driven motor 2 from the battery 6. Then, the H-ECU 24 controls the inverter 5 in order to apply the calculated electric quantity to the electrically driven motor 2 from the battery 6. In this case, it follows that the vehicle travels by a driving force obtained by adding a driving force outputted from the electrically driven motor 2 driven with the electric power of the battery 6 (which is hereinafter termed a battery driving force) to the driving force of the internal combustion engine.

Further, the H-ECU 24, if the request driving force is larger than the total driving force, controls the E-ECU 23 to increase the driving force of the internal combustion engine, and also controls the inverter 5 in order to apply to the electrically driven motor 2 the maximum electric power that can be outputted from the battery 6.

Note that the E-ECU 23, when starting up the internal combustion engine 1 in response to a request given from the H-ECU 24, inputs the output signal values of the water temperature sensor 18 and of the catalyst temperature sensor 15. Then, if the output signal value of the water temperature sensor 18 is less than a predetermined temperature, of if the output signal value of the catalyst temperature sensor 15 is less than an activation temperature, the E-ECU 23 transmits a warm-up operation request to the H-ECU 24 to warm up the internal combustion engine 1 or activate the exhaust gas purifying catalyst 14.

The H-ECU 24, upon receiving the warm-up operation request from the E-ECU 23, calculates an internal combustion engine driving force when performing the warm-up operation as well as calculating a request driving force from the accelerator aperture. Then, the H-ECU 24 calculates a battery driving force from the charging quantity (output signal of the SOC meter 16) of the battery 6, and judges whether or not a warm-up operation condition is established.

The warm-up operation condition described above is, for example, a condition (1) that the driving force of the internal combustion engine can cover the request driving force, and the battery 6 can be charged with the electric power generated by an extra driving force of the internal combustion engine, or a condition (2) that the driving force of the internal combustion engine is solely unable to cover the request driving force, however, the driving force obtained by adding the internal combustion engine driving force to the battery driving force, can cover the request driving force.

The H-ECU 24, when judging that the condition (1) or (2) is established, transmits to the E-ECU 23 a signal indicating a permission of the warm-up operation (which is called a warm-up operation permitting signal). The warm-up operation permitting signal includes a signal for designating an internal combustion engine driving force Pe when in the warm-up operation.

On the other hand, under the condition (1) given above, the internal combustion engine driving force can cover the request driving force. If it is judged that the battery 6 can not be charged with the electric power generated by the extra internal combustion engine driving force, however, the H-ECU 24 transmits to the E-ECU 23 a warm-up operation inhibiting signal and a request for stopping the internal combustion engine 1.

Furthermore, the H-ECU 23, when judging that the condition (2) is not established, transmits to the E-ECU 23 a signal indicating the inhibition of the warm-up operation (which is called a warm-up operation inhibiting signal) and a signal indicating a request for increasing the internal combustion engine driving force (which is termed a driving force increase requesting signal). The driving force increase requesting signal includes a signal for designating the internal combustion engine driving force Pe after being increased.

Next, the E-ECU 23, upon receiving the warm-up operation permitting signal from the H-ECU 24, executes the warm-up operation control so as to make the internal combustion engine driving force Pe contained in the warm-up permitting signal, coincident with the actual internal combustion engine driving force.

A method of retarding an ignition timing of each cylinder may be exemplified by way of the warm-up operation control. According to this retarding method, a burning velocity of an air-fuel air-fuel in each cylinder is delayed, and a temperature of the burned air-fuel mixture when opening the exhaust valve becomes higher than normal. Therefore, an exhaust temperature increases, and it is therefore feasible to activate the exhaust gas purifying catalyst 14 at an early stage.

Herein, in the case of implementing the ignition retarding control, it is desirable that the ignition timings of the respective cylinders be gradually retarded at a predetermined switching velocity and an abrupt fluctuations of the internal combustion engine driving force be restrained.

Such being the case, a contrivance in accordance with this embodiment is that the H-ECU 24 gradually changes a value of the internal combustion engine driving force Pe contained in the warm-up operation permitting signal in order to restrain the fluctuations of the internal combustion engine driving force due to the switching of the operation state of the internal combustion engine 1, while the E-ECU 23 gradually increases a retard quantity of the ignition timing, corresponding to a change in the internal combustion engine driving force Pe.

On this occasion, the H-ECU 24 determines the internal combustion engine driving force Pe according to the following formula (1):

$$Pe=\{A \cdot (\text{Warm-Up Operation Internal Combustion Engine Driving Force Pea}) + (100-A) \cdot (\text{Present Internal Combustion Engine Driving Force Peb})\}/100 \quad (1)$$

where A is the coefficient. The H-ECU 24 gradually changes the internal combustion engine driving force Pe from Peb to Pea by increasing stepwise the coefficient A from 0 up to 100.

On the other hand, the E-ECU 23, when receiving the warm-up operation inhibiting signal and the internal combustion engine driving force increase request from the H-ECU 24, advances the ignition timing of each cylinder to increase the internal combustion engine driving force. In this case also, it is desirable that the E-ECU 23 should restrain the abrupt fluctuations of the internal combustion engine driving force by gradually advancing the ignition timing of each cylinder at a predetermined switching velocity.

Then, a contrivance is that the H-ECU 24 gradually changes the value of the internal combustion engine driving force Pe contained in the driving force increase request signal in order to restrain the fluctuations of the internal combustion engine driving force, while the E-ECU 23 gradually increases an advance quantity of the ignition timing, corresponding to the change in the internal combustion engine driving force Pe.

On this occasion, the H-ECU 24 determines the internal combustion engine driving force Pe in accordance with the following formula (2):

$$Pe=\{B \cdot (\text{Warm-Up Operation Time Internal Combustion Engine Driving Force Pea}) + (100-B) \cdot (\text{Driving Force Increasing Time Internal Combustion Engine Driving Force Pec})\}/100 \quad (2)$$

where B is the coefficient. The H-ECU 24 gradually changes the internal combustion engine driving force Pe from Pea to Pec by decreasing stepwise the coefficient B from 100 down to 0.

Further, the E-ECU 23, when receiving the warm-up operation inhibiting signal and the request for stopping the internal combustion engine 1 from the H-ECU 24, halts the ignition of the spark plug 25 as well as stopping the fuel injection from the fuel injection valve, thereby stopping the operation of the internal combustion engine 1.

As discussed above, the E-ECU 23 and the H-ECU 24 actualize a warm-up operation control unit and an operation state switching unit according to the present invention.

The operation and the effect in this embodiment will hereinafter be explained.

Figure 2:
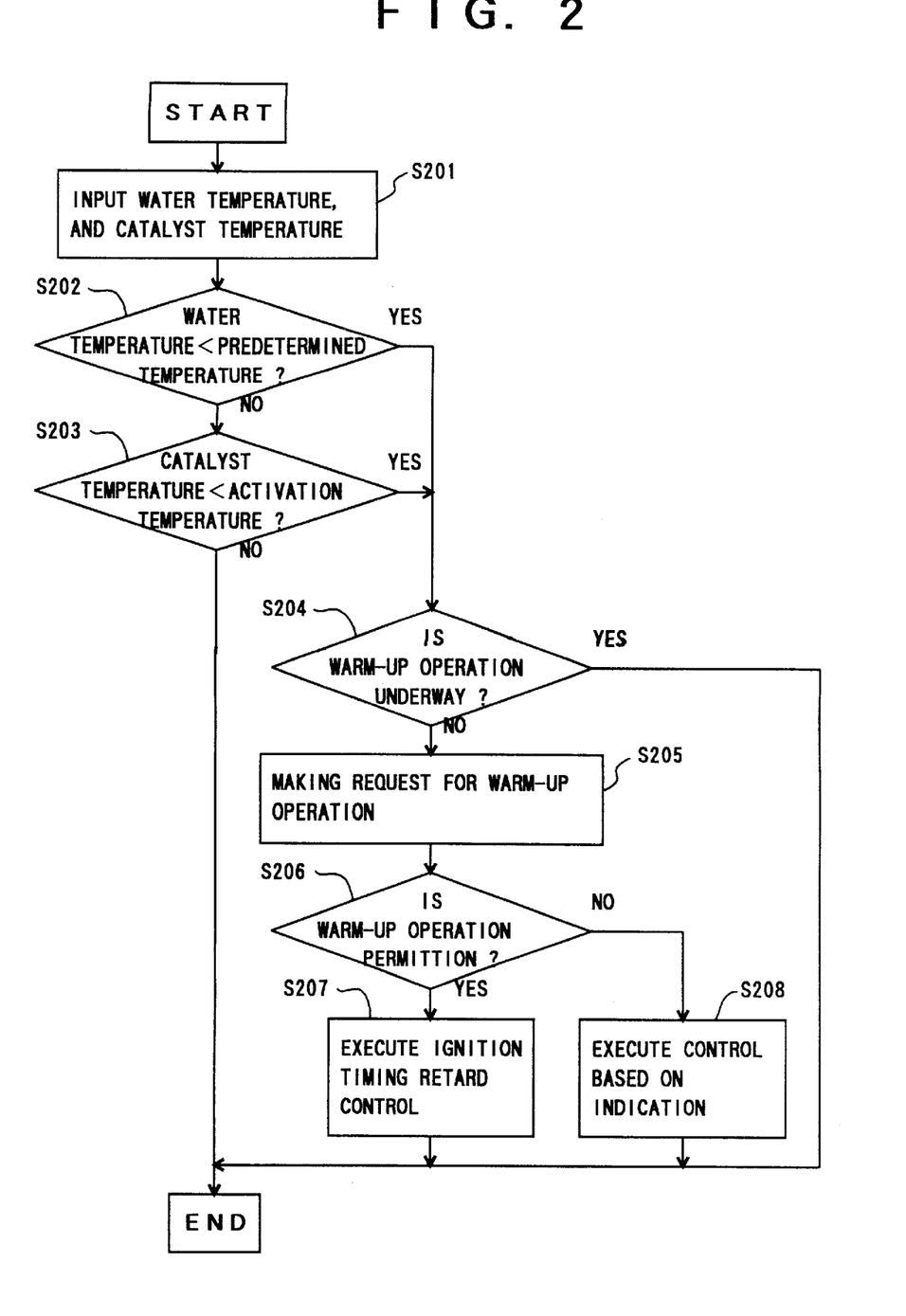
FIG. 2 is a flowchart showing a warm-up operation control routine.

The E-ECU 23 executes a warm-up operation control routine as shown in FIG. 2 at an interval of a predetermined time.

In the warm-up operation control routine, to begin with, the E-ECU 23 inputs in S201 output signals of the catalyst temperature sensor 15 and the water temperature sensor 17.

Subsequently, the E-ECU 23 judges in S202 whether or not the output signal value of the water temperature sensor 17 is less than a predetermined value. The E-ECU 23, when judging that the output signal value of the water temperature sensor 17 is over the predetermined value, advances to S203, and judges whether or not the output signal value of the catalyst temperature sensor 15 is less than an activation temperature.

In S203, the E-ECU 23, when judging that the output signal value of the catalyst temperature sensor 15 is over the activation temperature, infers that the warm-up process of the internal combustion engine 1 has been finished and that the exhaust gas purifying catalyst 14 has already been activated, and finishes an execution of this routine.

While on the other hand, the E-ECU 23, when judging in S202 that the output signal value of the water temperature sensor 17 is less than the predetermined value, or when judging in S203 that the output signal value of the catalyst temperature sensor 15 is smaller than the activation temperature, advances to S204 and judges whether or not the warm-up operation control has already been underway.

The E-ECU 23, when judging in S204 that the warm-up operation control has already been underway, finishes the present routing. The E-ECU 23, when judging that the warm-up operation control is not yet underway, advances to S205 and transmits a warm-up operation request signal to the H-ECU 24.

Then, the E-ECU 23, upon receiving a response signal to the warm-up operation request signal from the H-ECU 24, advances to S206 and judges whether or not the response signal is defined as a warm-up operation permitting signal.

The E-ECU 23, when judging in S206 that the response signal is the warm-up operation permitting signal, advances to S207, and executes an ignition timing retard control in accordance with the internal combustion engine driving force Pe contained in the warm-up operation permitting signal.

While on the other hand, the E-ECU 23, when judging in S206 that the response signal is a signal (an internal combustion engine stop signal or a driving force increase request signal) other than the warm-up operation permitting signal, advances to S208, and controls the operation state of the internal combustion engine 1 in accordance with the response signal. On this occasion, when the response signal is the driving force increase request signal, the E-ECU 23 executes the ignition timing advance control according to the internal combustion engine driving force Pe contained in the driving force increase request signal.

Figure 3:
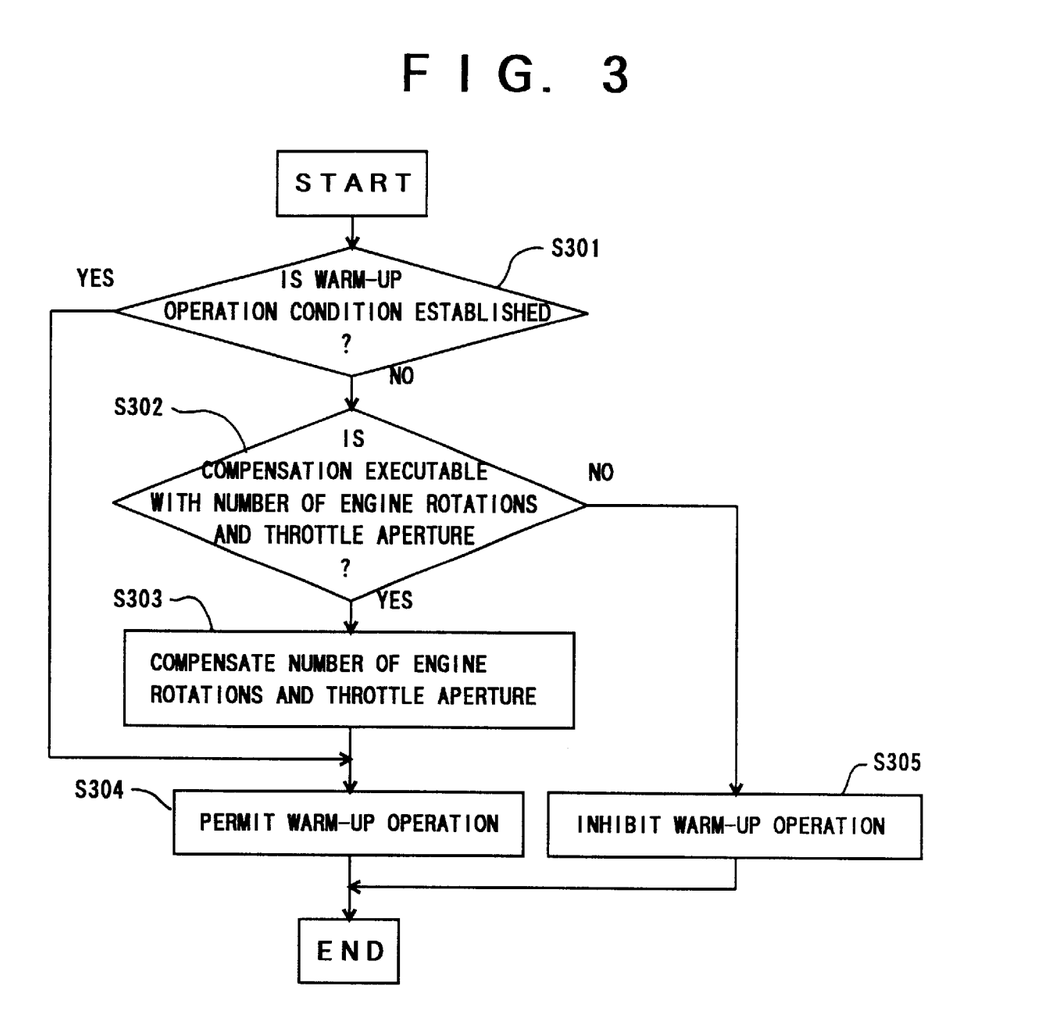
FIG. 3 is a flowchart showing an engine control routine.

Next, the H-ECU 24, when controlling the internal combustion engine 1, executes an engine control routine as shown in FIG. 3. This engine control routine is repeatedly executed at an interval of a predetermined time and also executed when receiving the warm-up operation request signal from the E-ECU 23.

In the engine control routine, to start with, the H-ECU 24 judges in S301 whether or not a warm-up operation condition is established, i.e., whether or nor there is established a condition (1) that the internal combustion engine driving force can cover the request driving force, and the battery 6 can be charged with the electric power generated by the extra internal combustion engine driving force, or a condition (2) that the internal combustion engine driving force can not solely cover the request driving force, however, the driving force obtained by adding the internal combustion engine driving force to the battery driving force, can cover the request driving force.

The H-ECU 24, when judging in S301 that the warm-up operation condition is established, advances to S304, wherein the H-ECU 24 calculates the internal combustion engine driving force Pe according to the formula (1) and transmits the warm-up operation permitting signal containing the calculated driving force Pe to the E-ECU 23.

By contrast, the H-ECU 24, when judging in S301 that the warm-up operation condition is not established, advances to S302 and judges whether or not the internal combustion engine driving force Pe can be attained by compensating the number of engine rotations or the suction air quantity.

The H-ECU 24, when judging in S302 that the internal combustion engine driving force Pe can be attained by compensating the number of engine rotations or the suction air quantity, moves forward to S303 and transmits to the E-ECU 23 a request signal for compensating the number of engine rotations or the suction air quantity.

Subsequently, the H-ECU 24 advances to S304 and transmits the warm-up operation permitting signal to the E-ECU 23.

Further, the H-ECU 24, when judging in S302 that the internal combustion engine driving force Pe can not be attained by compensating the number of engine rotations or the suction air quantity, advances to S305 and transmits to the E-ECU 23 the engine stop request signal or the driving force increase request signal together with the warm-up operation inhibiting signal.

According to the embodiment discussed above, if a large driving force as needed for the acceleration is required even during the warm-up control of the internal combustion engine 1 in a hybrid-powered vehicle, the internal combustion engine 1 is switched over from the warm-up operation state to a high-output operation state, and therefore the hybrid-powered vehicle promptly gains an increased driving force for traveling and thus travels with a prompt acceleration, whereby a drivability thereof can be enhanced.

Then, when the internal combustion engine 1 is switched over from the warm-up operation state to the high-output operation state, an exothermic quantity of the internal combustion engine 1 increases, and a temperature of the exhaust gas discharged out of the internal combustion engine 1 rises. Hence, it is possible to complete the warm-up process of the internal combustion engine 1 and the activation of the exhaust gas purifying catalyst 14 at an early stage.

Moreover, the internal combustion engine is switched over to the high-output operation state in response to a request of the driver even during the warm-up operation of the internal combustion engine, and hence there is no necessity for considering the internal combustion engine driving force during the warm-up operation. Then, it is feasible to perform a more positive warm-up operation (e.g., increasing the retard quantity), and the early warm-up of the internal combustion engine 1 and the early activation of the exhaust gas purifying catalyst 14 can be actualized.

Therefore, according to this embodiment, the exhaust gas purifying catalyst can be activated at the early stage as well as warming up the internal combustion engine 1 at the early stage without any decline of the drivability in the hybrid-powered vehicle.

Note that the method of retarding the ignition timing has been exemplified as the method of speeding up the warm-up of the exhaust gas purifying catalyst 14 in this embodiment, however, the present invention is not limited to this method. For example, the fuel injection quantity may be controlled so that an air/fuel ratio on the occasion of an inflow to the exhaust gas purifying catalyst 14 becomes a theoretical air/fuel ratio, an air/fuel ratio of the air-fuel mixture burned in at least a part of the cylinders becomes a fuel excessive atmosphere (rich atmosphere) in order to generate the exhaust gas containing a great amount of unburned HC and unburned CO and $O_2$, and an air/fuel ratio of the air-fuel mixture burned in some other cylinders becomes an oxygen excessive atmosphere (lean atmosphere).

In this case, the exhaust gas flowing to the exhaust gas purifying catalyst 14 contains a large quantity of unburned HC and unburned CO and $O_2$, and hence there are activated reaction of HC and Co to Nox and reaction of unburned HC and unburned CO to $O_2$ in the exhaust gas purifying catalyst 14, and a temperature rising velocity of the exhaust gas purifying catalyst 14 is increased by the reaction heat thereof.

According to the method described above, there are repeated the burning of the air-fuel mixture in the rich atmosphere and the burning of the air-fuel mixture in the lean atmosphere, so that a torque fluctuation of the internal combustion engine 1 occurs. In the case of the hybrid-powered mechanism, however, the battery 6 is used as a driving source for traveling for the duration of performing the warm-up operation control of the internal combustion engine 1. Therefore, it never happens that the drivability worsens due to the torque fluctuation of the internal combustion engine 1. Consequently, as compared with the vehicle the internal combustion engine of which always serves as the driving source for traveling, a more positive warm-up operation control can be carried out. For instance, when speeding up the warm-up based on the method described above, so-called fuel-cut is conducted, wherein the fuel injection is not effected in the cylinder in which to produce the air-fuel mixture in the oxygen excessive atmosphere. Thus, there may be positively speeded up the warm-up operation and reduced a burned-out fuel quantity.

Further, another method of speeding up the warm-up of the exhaust gas purifying catalyst 14 is that the fuel injection quantity may be controlled so that the air/fuel ratio on the occasion of the inflow to the exhaust gas purifying catalyst 14 becomes the theoretical air/fuel ratio, the air/fuel ratio of the air-fuel mixture burned in at least a part of the cylinders becomes the fuel excessive atmosphere (rich atmosphere) in order to generate the exhaust gas containing a great amount of unburned HC and unburned CO and $O_2$ and secondary air is mixed in the exhaust gas existing upstream of the exhaust agas purifying catalyst 14.

In this case, the exhaust gas flowing to the exhaust gas purifying catalyst 14 contains a large quantity of unburned HC and unburned CO and $O_2$, and hence there are activated reaction of HC and Co to Nox and reaction of unburned HC and unburned CO to $O_2$ in the exhaust gas purifying catalyst 14, and the temperature rising velocity of the exhaust gas purifying catalyst 14 is increased by the reaction heat thereof.

Moreover, still another method of activating the exhaust gas purifying catalyst 14 at the early stage si that the internal combustion engine 1 is fitted with a variable valve timing mechanism for changing a timing of opening and closing exhaust valve, and the variable valve timing mechanism may be controlled so that an exhaust valve opening timing is advanced a predetermined time when the temperature of the exhaust gas purifying catalyst 14 is lower than the activation temperature.

In this case, it follows that the exhaust valve is opened immediately after burning the fuel-air mixture in each cylinder of the internal combustion engine 1, and hence the temperature of the exhaust gas discharged from each cylinder rises, with the result that a high-temperature exhaust gas flows to the exhaust gas purifying catalyst 14. As a consequence, the exhaust gas purifying catalyst 14 receives a great quantity of heat from the exhaust gas and reaches the activation temperature earlier.

A further method of activating the exhaust gas purifying catalyst 14 may be a combination of the methods explained above. For example, at the initial stage of the warm-up process, the temperature of the exhaust gas flowing to the exhaust gas purifying catalyst 14 is increased by executing the process of retarding the ignition timing and the process of advancing the exhaust valve opening timing, and, after a predetermined time has elapsed since the execution of the warm-up process was started, in addition to the processes described above, the fuel injection quantity (and the secondary air quantity) may be controlled in order to generate the exhaust gas containing the large quantity of unburned HC, unburned CO and $O_2$.

Namely, when the whole exhaust gas purifying catalyst 14 is in a non-active state, the temperature of the exhaust gas purifying catalyst 14 is increased by rising the temperature of the exhaust gas flowing to the exhaust gas purifying catalyst 14, thereby activating a part of the exhaust gas purifying catalyst 14. Thereafter, the exhaust gas purifying catalyst 14 may be activated earlier in combination of the rising of the exhaust gas temperature with the activating of the reaction in the exhaust gas purifying catalyst 14.

On this occasion, the predetermined time explained above may take a previously set fixed value or a variable value determined corresponding to a catalyst temperature when starting the catalyst warming-up process. Moreover, an integrating suction air quantity from the starting time of the catalyst warming-up process may also be used as a substitute for the predetermined time described above.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine control apparatus of a hybrid powered vehicle including: an internal combustion engine; an electric motor; and warm-up operation controlling means for making a driving force of said electric motor as a main driving source for traveling under a predetermined condition, and controlling a warm-up operation of said internal combustion engine, said internal combustion engine control apparatus comprising:

operation state switching means for switching, when there is requested a driving force larger than a driving force that can be outputted by said electric motor and by said internal combustion engine which is on a warm-up operation during the warm-up operation of said internal combustion engine, said internal combustion engine from a warm-up operation state to a high-output operation state.

2. An internal combustion engine control apparatus of a hybrid powered vehicle constructed such that a driving force outputted from an internal combustion engine is used as a driving source for making said vehicle traveled or a driving source for generating electric power, the electric power generated by the driving force of said internal combustion engine is supplied to an electric motor or to electric power accumulating means for supplying said electric motor with the electric power, and said hybrid powered vehicle travels with the driving force outputted from at least one of said internal combustion engine and said electric motor and travels with its main driving source being the driving force from said electric motor driven by the electric power of said electric power accumulating means while controlling a warm-up operation of said internal combustion engine under a predetermined condition, said internal combustion engine control apparatus comprising:

operation state switching means for switching, when there is requested a driving force larger than a driving force that can be outputted by said electric power accumulating means and by said internal combustion engine which is on a warm-up operation during the warm-up operation of said internal combustion engine, said internal combustion engine from a warm-up operation state to a high-output operation state.

3. An internal combustion engine control apparatus of a hybrid powered vehicle, comprising:

an internal combustion engine;

electric power generating means driven by said internal combustion engine;

electric power accumulating means for accumulating the electric power generated by said electric power generating means;

an electric motor supplied for driving wheels with the electric power generated by said electric power generating means or the electric power accumulated in said electric power accumulating means;

power distributing means for distributing the driving force outputted from said internal combustion engine to said electric power generating means and wheels;

warm-up operation controlling means for controlling a warm-up operation of said internal combustion engine when said internal combustion engine is started up under a predetermined condition; and operation state switching means for switching, when there is requested a driving force larger than a driving force that can be outputted by said electric power accumulating means and by said internal combustion engine which is on a warm-up operation during the warm-up operation of said internal combustion engine, said internal combustion engine from a warm-up operation state to a high-output operation state.

4. An internal combustion engine control apparatus of a hybrid powered vehicle according to claim 1, wherein the warm-up operation control is to retard an ignition timing of said internal combustion engine.

5. An internal combustion engine control apparatus of a hybrid powered vehicle according to claim 1, wherein said internal combustion engine includes a variable valve timing mechanism for changing a timing of opening and closing at least an exhaust valve, and the warm-up operation control is to advance a timing of opening said exhaust valve.

6. An internal combustion engine control apparatus of a hybrid powered vehicle according to claim 1, wherein the warm-up operation control is to control a fuel injection quantity so that an air/fuel ratio of a fuel-air mixture burned in at least a part of cylinders of said internal combustion engine becomes a fuel excessive atmosphere, and that an air/fuel ratio of the fuel-air mixture burned in some other cylinders becomes an oxygen excessive atmosphere.

7. An internal combustion engine control apparatus of a hybrid powered vehicle according to claim 1, wherein said operation state switching means gradually switches over an operation state of said internal combustion engine.

8. An internal combustion engine control apparatus of a hybrid powered vehicle according to claim 1, wherein said operation state switching means gradually switches the operation state at a predetermined switching velocity.

9. An internal combustion engine control apparatus of a hybrid powered vehicle according to claim 2, wherein the warm-up operation control is to retard an ignition timing of said internal combustion engine.

10. An internal combustion engine control apparatus of a hybrid powered vehicle according to claim 2, wherein said internal combustion engine includes a variable valve timing mechanism for changing a timing of opening and closing at least an exhaust valve, and the warm-up operation control is to advance a timing of opening said exhaust valve.

11. An internal combustion engine control apparatus of a hybrid powered vehicle according to claim 2, wherein the warm-up operation control is to control a fuel injection quantity so that an air/fuel ratio of a fuel-air mixture burned in at least a part of cylinders of said internal combustion engine becomes a fuel excessive atmosphere, and that an air/fuel ratio of the fuel-air mixture burned in some other cylinders becomes an oxygen excessive atmosphere.

12. An internal combustion engine control apparatus of a hybrid powered vehicle according to claim 2, wherein said operation state switching means gradually switches over an operation state of said internal combustion engine.

13. An internal combustion engine control apparatus of a hybrid powered vehicle according to claim 2, wherein said operation state switching means gradually switches the operation state at a predetermined switching velocity.

14. An internal combustion engine control apparatus of a hybrid powered vehicle according to claim 3, wherein the warm-up operation control is to retard an ignition timing of said internal combustion engine.

15. An internal combustion engine control apparatus of a hybrid powered vehicle according to claim 3, wherein said internal combustion engine includes a variable valve timing mechanism for changing a timing of opening and closing at least an exhaust valve, and the warm-up operation control is to advance a timing of opening said exhaust valve.

16. An internal combustion engine control apparatus of a hybrid powered vehicle according to claim 3, wherein the warm-up operation control is to control a fuel injection quantity so that an air/fuel ratio of a fuel-air mixture burned in at least a part of cylinders of said internal combustion engine becomes a fuel excessive atmosphere, and that an air/fuel ratio of the fuel-air mixture burned in some other cylinders becomes an oxygen excessive atmosphere.

17. An internal combustion engine control apparatus of a hybrid powered vehicle according to claim 3, wherein said operation state switching means gradually switches over an operation state of said internal combustion engine.

18. An internal combustion engine control apparatus of a hybrid powered vehicle according to claim 3, wherein said operation state switching means gradually switches the operation state at a predetermined switching velocity.

* * * * *

UNITED STATES PATENT AND TRADEMARK OFFICE
CERTIFICATE OF CORRECTION

PATENT NO.   : 6,253,866 B1
DATED        : July 3, 2001
INVENTOR(S)  : Kojima

It is certified that error appears in the above-identified patent and that said Letters Patent is hereby corrected as shown below:

Title page,
Item [22], replace "December 3, 1998" with -- November 27, 1998 --.

Signed and Sealed this

Ninth Day of April, 2002

*Attest:*

*Attesting Officer*

JAMES E. ROGAN
*Director of the United States Patent and Trademark Office*